United States Patent [19]

Gibbons et al.

[11] 4,048,127

[45] Sept. 13, 1977

[54] CARBOHYDRATE-BASED CONDENSATION RESIN

[75] Inventors: John P. Gibbons, Western Springs; Lawrence Wondolowski, Downers Grove, both of Ill.

[73] Assignee: CPC International Inc., Englewood Cliffs, N.J.

[21] Appl. No.: 707,600

[22] Filed: July 22, 1976

[51] Int. Cl.$^2$ .............................................. C08L 3/02
[52] U.S. Cl. ...................................... 260/17.2; 260/9; 260/17.3
[58] Field of Search ....................................... 260/17.2

[56] References Cited

U.S. PATENT DOCUMENTS

| | | | |
|---|---|---|---|
| 1,815,930 | 7/1931 | Novotny et al. | 260/17.2 |
| 2,341,907 | 2/1944 | Cheetham | 260/17.2 |
| 2,362,086 | 11/1944 | Myers et al. | 260/17.2 |
| 2,555,058 | 5/1951 | Rouzet | 260/17.2 |

*Primary Examiner*—Edward M. Woodberry
*Attorney, Agent, or Firm*—David H. LeRoy; John P. Floyd

[57] ABSTRACT

A carbohydrate-phenolic resin and a process for production of same wherein an aldose saccharide, preferably a hexose, is reacted with a phenolic compound and urea in the presence of an acid catalyst to form a solid fusible resin which is curable with cross linking agents, such as hexamethylenetetramine. Instead of urea, use can also be made of diamines, such as toluene diamines and alkylene diamines.

23 Claims, No Drawings

CARBOHYDRATE-BASED CONDENSATION RESIN

This invention relates to carbohydrate-based condensation resins and a process for producing same, and more particularly to carbohydrate-phenol condensation resins incorporating polyfunctional nitrogen-containing compounds as coupling agents.

Condensation resins based upon phenol and aliphatic aldehydes and based upon urea and aliphatic aldehydes have been used for many years in the plastics industry. As is now well established, the aldehyde, usually formaldehyde, is reacted with phenol or urea in the presence of an acid or basic catalyst to form a condensation resin. The formaldehyde serves as a coupling agent, interconnecting the phenol or urea molecules.

For example, in a phenol-formaldehyde resin, the polymeric matrix includes the following groups:

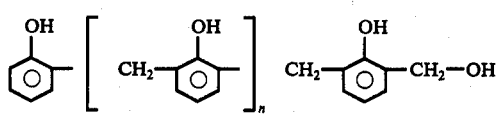

The formaldehyde serves a similar coupling function in urea formaldehyde resin which contains groups of the following type:

wherein $n$ is related to the molecular weight of the resin.

The basic raw material for condensation resins of the type described above is petroleum. As is now well known, supplies of petroleum are becoming increasingly limited, and prices have increased significantly. There is thus a need to replace at least a portion of the petroleum-based components of condensation resins of the type described above with a less expensive, more abundant material. Carbohydrates, readily available from plant sources, are thus one type of renewable resource ideally suited for use in the manufacture of plastics.

It has been proposed, as described in U.S. Pat. Nos. 1,593,342, 1,753,030, 1,801,053, 1,801,053, 1,868,216 and 1,923,321, to employ carbohydrates, such as dextrose, starch and the like, in phenol condensation resins whereby the carbohydrate, in effect, is substituted for a portion of the petroleum-based material, usually phenol. However, resins of the sort described in the foregoing patents are, for the most part, prepared by reaction of the carbohydrate with phenol, occasionally in the presence of an aldehyde or a nitrogen-containing compound, such as aniline and amino phenol. The result is that the amount of carbohydrate which can be used in the resin is limited by the somewhat lower reactivity of the carbohydrate.

It is accordingly an object of the present invention to produce and provide a method for producing a low cost resin system incorporating a carbohydrate with relatively high levels of substitution.

It is a more specific object of the invention to produce and provide a method for producing a carbohydrate-phenyl resin in which the phenol is partially replaced by the carbohydrate material to produce a resin having good strength properties and water resistance, useful for thermoset molding applications.

The concepts of the present invention reside in a carbohydrate-phenolic resin produced by reaction of an aldose saccharide, a phenolic compound and urea in the presence of an acid catalyst. The solid fusible resin produced in accordance with the concepts of this invention can embody relatively high levels of carbohydrate without sacrificing the physical properties of the resulting resin. The resin systems of the present invention are characterized by good water resistance and improved strength properties.

Unlike the prior art efforts to react a phenolic compound with a carbohydrate, the present invention utilizes urea as a coupling agent which is believed to link the carbohydrate component with the phenol, thereby minimizing the amount of the most expensive reagent, phenol, necessary to produce a solid fusible resin. Without limiting the present invention as to theory, it is believed that, using dextrose as illustrative of the carbohydrate, the carbohydrate forms a diureide which is then reacted with the phenol. This postulated mechanism may be illustrated by way of the following reaction in which the dextrose is dehydrated to hydroxymethyl furfural, and then the hydroxymethyl furfural is reacted with urea to form a diureide:

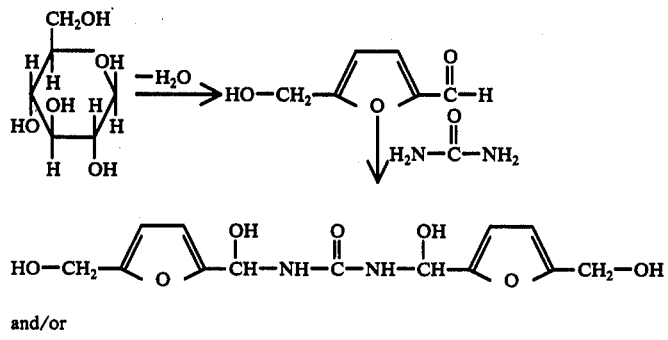

The resulting diureide is then capable of reaction with phenol to yield a resin believed to contain the following groups:

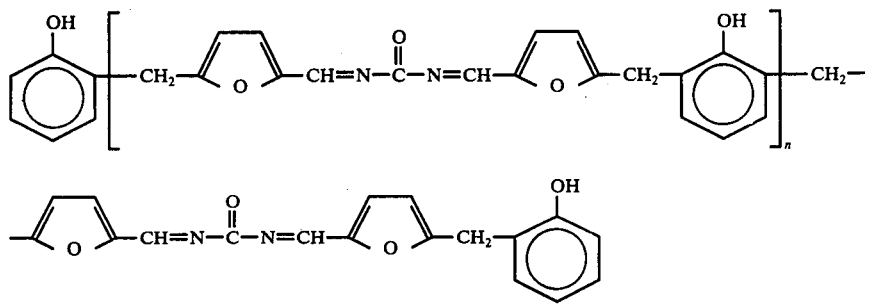

The foregoing postulated structure shows that, using urea as a coupling agent in accordance with the concepts of this invention, use can be made of 1 mole of dextrose for every mole of phenol employed. That permits the amount of phenol employed in the resin to be cut in half, if desired, with a concomitant reduction in the cost of the resin, or without sacrificing physical properties of the resin.

In the practice of this invention, the preferred carbohydrate is dextrose, although a variety of other carbohydrates can be used as desired. In general, use can be made of aldose saccharides containing 1 to $10^6$ saccharide units per molecule, with the preferred aldoses being hexoses and pentoses. Included are dextrose, maltose, maltotriose, lactose, sucrose, glycogen, glucosides, corn syrup, low D.E. hydrolyzed cereal solids and the like.

Also included as the carbohydrate useful in the practice of this invention are the various starches containing as many as $10^6$ repeating units. Such starches can be represented by the structure:

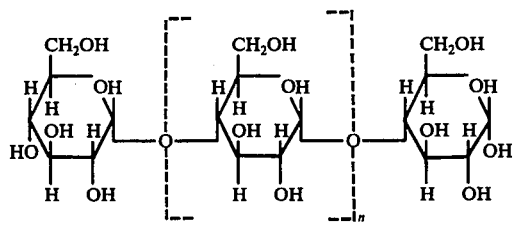

wherein $n$, designating the number of repeating units, can range from up to $10^6$. Starches suitable for use in the practice of this invention include all varieties of starch, such as corn starch, tapioca starch, wheat starch, grain sorghum, potato starch, rice starch, sago, etc., as well as types and grades thereof including waxy starches, high amylose starches, chemically modified starches, dextrins, thin boiling starches and pregelatinized starches. Also included are crude starches, such as mill starch, corn flour, wheat flour, brewers grits, broken rice, etc.

As the phenolic compound used in the practice of this invention, preferred are the phenolic compounds having the formula:

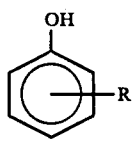

wherein R is a group selected from $C_1$ to $C_3$ alkyl, $C_1$ to $C_3$ alkoxy, halogen, hydroxy and hydrogen. The preferred phenolic compound is phenol, but other phenolic compounds include cresol, chlorophenol, bromophenol, resorcinol and the like.

The relative proportions of reactants employed in the practice of this invention can be varied within relatively wide limits. One of the advantages of the present invention stems from the fact that use can be made of one mole of the carbohydrate for every mole of phenol employed, although it will be understood that, if desired, use can also be made of greater amounts of phenol. In general, the amount of phenol employed ranges from 0.1 to 10 moles of phenolic compound for each mole of carbohydrate employed, and preferably 0.1 to 1.5 moles of phenolic compound per mole of carbohydrate. As will likewise be appreciated by those skilled in the art, the porportions of urea employed depend upon the proportions of phenolic compound based on the carbohydrate. In general, use can be made of 0.1 to 5 moles of urea for each mole of carbohydrate, and preferably 0.2 to 0.8 moles of urea per mole of carbohydrate.

The acid catalysts used in the practice of this invention are typical of those acid catalysts employed in the condensation of aldehydes with phenols and urea. Included are the strong mineral acids such as sulfuric acid, hydrochloric acid, etc.; sulfonics include paratoluene sulfonic acid, napthalene sulfonic acid, etc.; sulfur trichloride, antimony chloride; as well as a number of others, all of which are well known to those skilled in the art.

In carrying out the reaction in the practice of this invention it is possible to form the diureide prior to reaction with the phenolic compound, although it has been found that there is frequently no advantage in doing so. It is sufficient to simply place the reactants in a reaction vessel in the presence of an acid catalyst and then heat the reaction mixture to a temperature sufficient to cause the condensation reaction to occur. In general, use can be made of reaction temperatures ranging from 70° to 200° C, with the length of time of the reaction depending upon the reaction temperature.

The resulting solid-fusible resin is a brittle material which can be thermoset by the addition of a suitable cross linking agent, preferably hexamethylenetetramine. The resins thus produced are thermosetting and find widespread use as molding and foundry resins. They are characterized by excellent water resistance and improved properties, particularly tensile strengths.

While not equivalent to urea in the practice of this invention, use can also be made of polyfunctional amines as the coupling agent in place of urea. Such amines include amines of the formula:

$$H_2N-R-NH_2$$

wherein R is a divalent organic group, preferably an alkylene group containing 2 to 10 carbon atoms (e.g., dimethylene, trimethylene, tetramethylene, etc.) or an arylene group such as phenylene and phenylene substituted with a $C_1$ to $C_3$ alkyl group, $C_1$ to $C_3$ alkoxy group, etc.

It will also be appreciated by those skilled in the art that various additives can be made to the reaction mixture. For example, it has been found that the addition of fatty acid amines, preferably containing 12 to 22 carbon atoms, can be added to the reaction vessel during the reaction to further increase water resistance and final thermoset resin moldability. For this purpose, use can be made of a variety of fatty acid amines commercially available, including, for example, ARMEEN T-Tallow amine, a long chain fatty acid amine from Armak.

This invention is further illustrated by the following examples, which, however, are not to be taken as limiting in any respect. All parts and percentages, unless expressly stated to be otherwise, are by weight.

EXAMPLE 1

This example illustrates the practice of this invention, using dextrose, urea and phenol as the reactants.

A 1000 ml reaction flask equipped with a condenser, stirrer and thermometer is charged with 360 g of dextrose, 60 g of urea and 208 g of 90% phenol, corresponding to a mole ratio of dextrose-urea-phenol of 1:0.5:1.

2.5 ml of 5N sulfuric acid catalyst are added to the reaction flask, and the flask heated to a temperature varying between 123° in 182° C for about 8.6 hours. During that time, 171 ml of water are collected from the reaction vessel.

The resulting resin, a solid black material at room temperature, is recovered from the reaction vessel.

EXAMPLE 2

This example illustrates the use of starch as the carbohydrate in the preparation of a carbohydrate-phenol condensation resin.

A 500 ml reaction flask is charged with 184 g of starch (Argo Code 3005), 104 g of 90% phenol, 100 g of water and 14 g of 5N $H_2SO_4$.

The resulting mixture is stirred initially at 95° to 114° C to hydrolyze the starch and thereby form a black solution from which 105 ml of water are collected.

At this stage, 30 g of urea is added to the flask, and the condensation reaction proceeds at a temperature varying from 114° to 183° C over a period of 6.4 hours. During the latter period, an additional 101 ml of water are recovered from the reaction vessel.

The resulting resin weighs 210 g and is a brittle solid at room temperature.

EXAMPLE 3

Using the apparatus and procedure described in Example 2, 360 g of dextrose, 60 g of urea, 204 g of 90% phenol and 9.6 g of 5N $H_2SO_4$ are charged to the reaction vessel. Water of condensation, totalling 206 ml, is collected over a period of 9.1 hours while the reaction temperature of the vessel varies between 118° to 185° C.

Recovered from the reaction vessel are 380 g of a black resin, brittle at room temperature.

EXAMPLE 4

This example illustrates the practice of this invention wherein the resin is prepared in the presence of a fatty acid amine to improve the water resistance of the resin and the final thermoset resin moldability.

Into a 500 ml flask, there is charged 180 g of dextrose, 30 g of urea, 104 g of 90% phenol, 9 g of ARMEEN T-Tallow amine and 1.4 g of 5N $H_2SO_4$. The reactants are cooked in the reaction vessel at a temperature from 129° to 189° C for a period of 4.9 hours; during that time, 97.5 ml of water of condensation are collected.

The resulting resin is separated from the reaction vessel, and is a black material, brittle at room temperature.

EXAMPLE 5

This example illustrates the effect of varying the dextrose-urea-phenol molar ratios on physical properties, namely water resistance and resin moldability.

A. In the first test, a 1:1:1 molar ratio of dextrose-urea-phenol is made by adding 180 g of dextrose, 60 g of urea, 104 g of 90% phenol and 2.8 of 5N $H_2SO_4$ to the reaction flask. The reaction temperature varies from 127° to 194° C and 112 ml of water of condensation is recovered in 6.1 hours.

B. In the next test, the molar ratio of dextrose-urea-phenol is 1:0.75:1, with 180 g of dextrose, 45 g of urea, 104 g of 90% phenol and 1.4 g of 5N $H_2SO_4$ being added to the reaction vessel. The condensation reaction is run for 4.7 hours at 130° to 180° C, while collecting 98.5 ml water of condensation.

C. In this test, the mole ratio is 1:0.25:1 obtained by using 180 g of dextrose, 15 g of urea, 104 g of 90% phenol, 9 g of ARMEEN T and 1.4 g of 5N $H_2SO_4$. The temperature ranges from 129° to 180° C for 4.8 hours, with 91 ml water of condensation being collected.

EXAMPLE 6

This example illustrates the use of toluene diamine as the nitrogen-containing coupling agent.

Using the procedure described in Example 1, there is charged to a 500 ml flask, 180 g of dextrose, 61.1 g of toluene diamine, 104 g of 90% phenol and 1.4 g of 5N $H_2SO_4$. The reactants are maintained at 113° to 186° C for 4.2 hours, during which 79 ml water of condensation are obtained.

The black resin, weighing 260 g was obtained, and brittle at room temperature.

EXAMPLE 7

This example illustrates the use of ethylene diamine as the polyfunctional amine coupling agent in the practice of this invention.

Using the procedure described in Example 6, a reaction mixture is formed of 180 g of dextrose, 30 g of ethylene diamine, 104g of 90% phenol and 1.4g of 5N $H_2SO_4$ as the catalyst. The reaction occurs over 5 hours, while the temperature varies from 111° to 178° C. A total of 96 ml water of condensation are recovered.

The resulting resin is a black material, brittle at room temperature.

EXAMPLE 8

This example illustrates the use of the resins prepared in accordance with the concepts of this invention in molding applications, including the physical properties obtainable in the practice of the invention.

Each of the resins from Example 1 through 4, 5(A) 5(B), 5(C), 6 and 7 is compounded in accordance with the following recipe:

| | |
|---|---|
| Resin | 46 g |
| Hexamethylenetetramine | Varied quantities as indicated |
| Calcium stearate | 2.0 g |
| Calcium oxide | 2.0 g |
| Wood flour | 46 g |

Each of the resins are compounded with the above recipe and milled at 200° F for 2 minutes. The recipe is then formed into bars (5 inch × 0.5 inch × ⅛ inch) by molding at 350° F for 5 minutes.

The resulting test bars are then tested to determine their water resistance, first by contacting the test bars with boiling water for 2 hours and, in another test, by immersion in water for 24 hours in accordance with ASTM D570-63 (6a). The bars are also tested to determine their flexural modulus. The results of those tests are set forth in the following table:

| | | | Water Resistance | | | |
|---|---|---|---|---|---|---|
| | | | 2 Hr Boiling Water | | ASTM D570-63 (6a) 24 Hour Immersion | | Flexural Modulus |
| | Example | Hexa, % | % $H_2O$ Absorbed | % Weight Loss | % $H_2O$ Absorbed | % Weight Loss | psi × $10^5$ |
| 1. | Dextrose-Urea-Phenol, 1:0.5:1 Molar Ratio | 7.8 | 6.48 | 1.48 | 1.24 | 0.19 | 11.3 |
| | | 10.0 | 5.05 | 1.03 | 1.16 | 0.18 | 11.1 |
| | | 20.0 | 5.66 | 3.34 | 2.18 | 1.07 | 11.1 |
| 2. | Starch-Urea-Phenol, 1:0.5:1 Molar Ratio | 5.0 | 7.35 | 2.10 | 1.86 | 0.44 | 11.4 |
| | | 10.0 | 5.55 | 1.04 | 1.84 | +0.07 | 11.2 |
| | | 20.0 | 7.12 | 3.59 | 3.99 | 0.74 | 10.6 |
| 3. | Dextrose-Urea-Phenol, 1:0.5:1 Molar Ratio | 7.8 | * | 3.81 | 4.52 | 0.70 | 8.2 |
| | | 10.0 | 3.17 | 0.85 | 1.24 | 0.15 | 10.8 |
| | | 20.0 | 5.52 | 4.39 | 2.97 | 1.71 | 10.3 |
| 4. | Dextrose-Urea-Phenol Tallow Amine, 1:0.5:1 Molar Ratio | 7.8 | 3.49 | 0.39 | 1.08 | 0.22 | 9.4 |
| | | 10.0 | 3.38 | 0.31 | 1.32 | 0.12 | 9.7 |
| | | 20.0 | 4.47 | 1.61 | 1.98 | 0.30 | 10.3 |
| 5(A) | Dextrose-Urea-Phenol, 1:1:1 Molar Ratio | 5.0 | 5.70 | 2.48 | 1.54 | 0.47 | 10.6 |
| | | 7.6 | 5.32 | 2.63 | 1.18 | 0.59 | 11.9 |
| | | 10.0 | 6.34 | 3.20 | 2.76 | 0.78 | 9.5 |
| 5(B) | Dextrose-Urea-Phenol, 1:0.75:1 Molar Ratio | 5.0 | 5.78 | 1.61 | 1.57 | 0.66 | 9.3 |
| | | 7.6 | 5.45 | 3.45 | 1.67 | 0.86 | 11.6 |
| | | 10.0 | 5.83 | 4.89 | 1.98 | 1.46 | 11.7 |
| 5(C) | Dextrose-Urea-Phenol, 1:0.25:1 Molar Ratio | 5.0 | 6.61 | 1.02 | 1.87 | 0.08 | 8.5 |
| | | 7.6 | 5.82 | 0.84 | 1.65 | 0.07 | — |
| | | 10.0 | — | — | — | — | — |
| 6. | Dextrose-toluene-Diamine-phenol, 1:0.5:1 Molar ratio | 3.0 | 8.48 | 2.50 | 3.15 | 1.60 | 7.6 |
| | | 5.6 | — | — | — | — | — |
| | | 7.0 | — | — | — | — | — |
| 7. | Dextrose-Ethylene-Diamine-phenol, 1:0.5:1 Molar Ratio | 5.6 | 9.13 | +0.42 | 2.99 | 0 | 9.6 |
| | | 7.0 | 13.38 | +3.95 | 3.98 | 0.81 | 10.6 |
| | | 10.0 | 8.39 | +0.61 | 2.42 | 0.07 | 10.7 |

*Data for the sample was considered not representative, and discarded.

As can be seen from the foregoing table, the resins of this invention have good water resistance as well as excellent strength properties.

EXAMPLE 9

This example is provided for comparative purposes and illustrates the use of a monofunctional amine compound, aniline, in accordance with the practice of the prior art.

A. A 1000 ml reaction flask of the type utilized in Example 1 is charged with 183 g of dextrose, 93 g of aniline, 103 g of 90% phenol and 1.5 g of 5N $H_2SO_4$. The condensation reaction continues for 145 minutes at temperatures varying from 109° to 183° C. A total of 95 ml of water of condensation is collected.

B. Using the same procedure as described above, 180 g of dextrose, 53 g of 90% phenol, 94 g of aniline and 1.3 g of 5N $H_2SO_4$ are charged to a reaction vessel. The reaction occurs over 4.7 hours at reaction temperatures ranging from 113° to 168° C. A total of 83 ml of water of condensation is collected during the reaction.

C. Using the same procedure as described in Example 8, the resin is compounded, milled and molded into bars as described in that example. The bars are subjected to the same physical tests described in Example 7 with the following results:

| | | Water Resistance | | | | |
|---|---|---|---|---|---|---|
| | | 2 Hr.Boiling Water | | ASTM D570-63 (6a) 24 Hour Immesion | | Flexural Modulus |
| Example | Hexa, % | % $H_2O$ Absorbed | % Weight Loss | % $H_2O$ Absorbed | % Weight Loss | psi × $10^5$ |
| 9(A) | 7.8 | 3.55 | 1.09 | 0.89 | 0.0 | 10.3 |
| | 10.0 | 3.32 | 0.74 | 0.93 | 0.07 | 10.3 |
| | 20.0 | 6.79 | 11.25 | 3.09 | 3.2 | 10.2 |
| 9(B) | 7.8 | 4.45 | 1.79 | 1.19 | 0.10 | 8.9 |
| | 10.0 | 5.00 | 2.40 | 1.31 | 0.32 | 9.2 |

-continued

| | | Water Resistance | | | | |
|---|---|---|---|---|---|---|
| | | | ASTM D570-63 (6a) | | | |
| | | 2 Hr.Boiling Water | | 24 Hour Immesion | | Flexural |
| | Hexa, | % H$_2$O | % Weight | % H$_2$O | % Weight | Modulus |
| Example | % | Absorbed | Loss | Absorbed | Loss | psi × 10$^5$ |
| | 20.0 | 7.37 | 4.51 | 3.88 | 1.65 | 9.2 |

As can be seen from the foregoing data using aniline as in the prior art, the resulting test bars have excellent water resistance, but have a strength, expressed as flexural modulus, less than that achieved using urea as the coupling agent.

EXAMPLE 10

This example illustrates the use of corn flour as the carbohydrate employed in the practice of this invention.

A 500 ml reaction flask was charged with the following ingredients: 184 g starch (yellow corn flour), 104 g phenol (90% d.b.), 30 g urea, and 40 g 5 N H$_2$SO$_4$. The starch was added to the flash in two increments and hydrolysis allowed to proceed over a period of 3 hours whereby the urea was then added. The condensation reaction occurred over a period of 8.2 hours at a temperature of 112°–186° C while collecting 118 ml of water. A black, brittle solid (yield 223 g) at room temperature was obtained. The product was compounded, milled and tested for water resistance and strength properties as given below:

| | | Water Resistance | | | | |
|---|---|---|---|---|---|---|
| | | 2 hr.Boiling Water | | 24 hr. Immersion | | Flexural |
| | Hexa, | % H$_2$O | % Weight | % H$_2$O | % Weight | Modulus |
| Example | % | Absorbed | Loss | Absorbed | Loss | psi × 10$^5$ |
| | 7 | 7.00 | 0.62 | 2.03 | 0.05 | 12.0 |
| 10 | 10 | 6.10 | 0.80 | 2.37 | +0.19 | 11.4 |
| | 20 | 7.28 | 3.92 | 4.25 | 1.20 | 10.4 |

As will be appreciated by those skilled in the art, it is possible, and sometimes desirable, in the practice of this invention, to form the diureide prior to the reaction with the phenolic compound. This concept of the invention may be illustrated by reference to the following example.

EXAMPLE 11

Diglucose ureide was prepared according to the directions in U.S. Pat. No. 2,967,859.

The reaction of Example 3 was repeated using diglucose ureide in place of dextrose and urea. Water evolution was slower requiring 20 hours for completion. From 110 g of the diglucose ureide was obtained 133 g of black product.

When resins were prepared from the product in the usual manner, they showed the following properties:

| | | Water Resistance | | | | |
|---|---|---|---|---|---|---|
| | | 2 hr Boiling Water | | 24 hr Immersion | | Flexural |
| | Hexa, | % H$_2$O | % Weight | % H$_2$O | % Weight | Modulus |
| Example | % | Absorbed | Loss | Absorbed | Loss | psi × 10$^5$ |
| | 7.0 | 3.70 | 0.0 | 0.77 | 0.05 | 10.4 |
| 11 | 10.0 | 2.95 | 0.0 | 0.91 | 0.0 | 10.5 |
| | 20.0 | 3.32 | 0.68 | 1.2 | 0.0 | 10.1 |

While the invention has been described in connection with specific embodiments thereof, it will be understood that it is capable of further modification, and this application is intended to cover any variations, uses, or adaptions of the invention following, in general, the principles of the invention and including such departures from the present disclosure as come within known or customary practice in the art to which the invention pertains and as may be applied to the essential features hereinbefore set forth, as fall within the scope of the invention.

We claim:

1. A process for producing a carbohydrate-phenolic resin comprising reacting in the presence of an acid catalyst
    1. an aldose saccharide;
    2. a phenolic compound having the formula

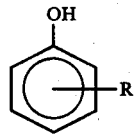

wherein R is selected from the group consisting of C$_1$ to C$_3$ alkyl, C$_1$ to C$_3$ alkoxy, halogen, hydroxy and hydrogen; and
    3. urea;
to form a solid, fusible resin, and separating the resin from the reaction mixture.

2. A process as defined in claim 1 wherein the saccharide is a hexose.

3. A process as defined in claim 1 wherein the phenolic compound is phenol.

4. A process as defined in claim 1 wherein the aldose saccharide is a starch.

5. A process as defined in claim 1 wherein the phenolic compound is employed in an amount within the range of 0.1 to 10 moles of phenolic compound for each mole of anhydroglucose unit.

6. A process as defined in claim 1 wherein the urea is employed in an amount ranging from 0.1 to 5 moles of urea for each mole of anhydroglucose unit.

7. A process as defined in claim 1 wherein the catalyst is a strong mineral acid.

8. A process as defined in claim 1 which includes the step of curing the solid fusible resin with a cross linking agent to render the resin thermosetting.

9. A carbohydrate-phenolic resin produced by the process defined in claim 1.

10. A process as defined in claim 1 wherein the aldose saccharide is reacted with urea prior to contact with the phenolic compound.

11. A process for producing a carbohydrate-phenolic resin comprising reacting in the presence of an acid catalyst
  1. an aldose saccharide;
  2. a phenolic compound having the formula

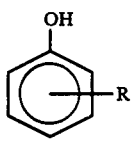

wherein R is selected from the group consisting of $C_1$ to $C_3$ alkyl, $C_1$ to $C_3$ alkoxy, halogen, hydroxy and hydrogen; and
  3. a polyfunctional amine having the formula:

wherein R is a divalent organic group;

to form a solid, fusible resin, and separating the resin from the reaction mixture.

12. A process as defined in claim 11 wherein the saccharide is a hexose.

13. A process as defined in claim 11 wherein the phenolic compound is phenol.

14. A process as defined in claim 11 wherein the aldose saccharide is a starch.

15. A process as defined in claim 11 wherein the phenolic compound is employed in an amount within the range of 0.1 to 10 moles of phenolic compound for each mole of aldose saccharide.

16. A process as defined in claim 11 wherein the polyfunctional amine is employed in an amount ranging from 0.1 to 5 moles for each mole of aldose saccharide.

17. A process as defined in claim 11 wherein the catalyst is a strong mineral acid.

18. A process as defined in claim 11 which includes the step of curing the solid, fusible resin with a cross linking agent to render the resin thermosetting.

19. A process as defined in claim 11 wherein R is selected from the group consisting of phenylene and substituted phenylene.

20. A process as defined in claim 11 wherein R is a $C_2$ to $C_{10}$ alkylene group.

21. A carbohydrate-phenolic resin produced by the process defined in claim 11.

22. A process as defined in claim 11 wherein the aldose saccharide is reacted with polyfunctional amine prior to contact with the phenolic compound.

23. A process for producing a carbohydrate-phenolic resin comprising reacting urea or a diamine with a carbohydrate in the presence of an acid catalyst to yield a nitrogenous intermediate product, reacting the intermediate product with a phenolic compound to form a solid fusible resin, and separating the resin from the reaction mixture.

* * * * *